United States Patent [19]

Milligan et al.

[11] Patent Number: 4,885,356
[45] Date of Patent: Dec. 5, 1989

[54] HIGH MOLECULAR WEIGHT POLY(TOLUENEDIAMINE ARAMIDE) AND A METHOD FOR THEIR PREPARATION

[75] Inventors: Barton Milligan, Freeport, The Bahamas; Roland Libers, Dickinson, Tex.

[73] Assignee: Air Products and Chemicals, Inc., Allentown, Pa.

[21] Appl. No.: 212,449

[22] Filed: Jun. 28, 1988

[51] Int. Cl.$^4$ ............................................. C08G 69/32
[52] U.S. Cl. .................................. 528/340; 528/348; 528/349
[58] Field of Search ..................... 528/340, 348, 349

[56] References Cited

U.S. PATENT DOCUMENTS

| | | | |
|---|---|---|---|
| 2,130,948 | 10/1938 | Carother | 18/54 |
| 3,006,899 | 11/1961 | Hill, Jr. et al. | 260/78 |
| 3,063,966 | 11/1962 | Kwolek et al. | 260/78 |
| 3,094,511 | 6/1963 | Hill, Jr. et al. | 260/78 |
| 3,640,970 | 2/1972 | Ozawa et al. | 260/78 |
| 4,009,154 | 2/1977 | Nona et al. | 260/78 |

FOREIGN PATENT DOCUMENTS

P26068780  9/1977  Fed. Rep. of Germany .

*Primary Examiner*—Harold D. Anderson
*Attorney, Agent, or Firm*—Russell L. Brewer; James C. Simmons; William F. Marsh

[57] ABSTRACT

This invention relates to high molecular weight toluenediamine-containing polyamide resins formed by the reaction of a mixture of 2,4-toluenediamine and 2,6-toluenediamine and derivatives thereof with an aromatic diacid or precurser thereof. The resulting polyamides are amorphous, as opposed to crystalline. Because they are amorphous, they lend themselves to a wide variety of processing techniques and because of their high molecular weight, they have outstanding physical properties.

The polyamides are prepared using a precondensate method wherein a mixture of the toluenediamine isomers and aromatic acid, usually in the form of the aromatic acid dihalide, is reacted at relatively low temperatures forming a precondensate and the precondensate subsequently polymerized in the presence of an acid acceptor.

20 Claims, No Drawings

HIGH MOLECULAR WEIGHT POLY(TOLUENEDIAMINE ARAMIDE) AND A METHOD FOR THEIR PREPARATION

TECHNICAL FIELD

This invention relates to high molecular weight amorphous toluenediamine containing polyamides and a process for preparing such toluenediamine containing polyamides.

BACKGROUND OF THE INVENTION

Aromatic polyamides have been known for a substantial period of time and are usually prepared by the reaction of an aromatic diamine with a dibasic acid or derivative. Aromatic polyamides have been used in various applications including electrical/electronic applications in various forms but generally not as transparent, high Tg, amorphous films or coatings. Most commercial aromatic polyamides presently are crystalline materials e.g. aromatic polyamides based on isophthalic acid and m-phenylenediamine; the liquid crystalline aromatic polyamides are based on terephthalic acid and p-phenylenediamine. These crystalline aromatic polyamides have excellent properties but films can only be cast from very strong (and often toxic) solvents such as anhydrous (or fuming) sulfuric acid, anhydrous hydroluoric acid, chlorosulfonic acid, fluorosulfonic acid, or hexamethyl phosphoramide and the resultant films are not transparent due to the resultant crystallinity.

Poly(amide-imides) have also been utilized as films for electrical/electronic applications and are formed by the reaction of trimellitic anhydride with methylene dianiline). The poly(amide-imide) films are amorphous, transparent, and have high Tg's—but are based on high cost monomers. Another class of materials termed transparent polyamides, which are amorphous, exist and are utilized for injection molding applications. These polymers contain aliphatic carbon units in the main chain and are thus limited in thermal stability. Additionally, they exhibit glass transition temperatures of 150° C. thus cannot be considered for high performance electrical/electronic film applications.

There is substantial patent literature regarding polyamide resins and their preparation. for example, the early polyamides such as those disclosed in U.S. Pat. No. 2,130,948 had low melting points and poor thermal stability in air at elevated temperatures. In the early 1960's, several patents assigned to the duPont Company, e.g., U.S. Pat. Nos. 3,006,899; 3,063,966; and 3,094,511 disclose processes for preparing aromatic polyamides and discuss two conventional procedures for producing the aromatic polyamides. Melt polymerization involving high temperature polymerization, up to 300° C., was suggested as one type but was objectional since water-white polymers could not be prepared at such elevated temperatures. Low temperature polymerization was suggested for reducing degradation associated with melt polymerization but reaction between the acid halide and solvent interfered with the production of high molecular weight polymers.

U.S. Pat. No. 3,006,899 discloses the preparation of film and fiber from high molecular weight wholly aromatic polyamides by carrying out the interfacial polymerization of an aromatic diamine with an aromatic diacid chloride in the presence of a cyclic, non-aromatic oxygenated organic solvent, e.g., tetrahydrofuran, tetramethylene sulfone, and cyclohexanone. Inorganic alkaline materials such as sodium carbonate were preferred as acid acceptors although organic acid acceptors such as triethylamine were alleged as being suited for producing such high molecular weight polyamides. Example III shows a reaction product of 2,4-diaminotoluene with terephthaloyl chloride and the polymerization of such materials to yield a polymer having an inherent viscosity of 1.37 (measured in concentrated sulfuric acid) at 30° C. at a concentration of 0.5 grams per 100 cc of solution.

U.S. Pat. No. 3,063,966 discloses a process for making wholly aromatic polyamides using low temperature reactions, e.g., below 50° C. A halogenated non-aromatic hydrocarbon was used as a solvent and organic tertiary amines were used as acid acceptors in preparing the polymer. Amide type organic compounds, e.g., dimethylacetamide, N-acetyl pyrrolidine and N-dimethylpropionamide were suggested as being suitable solvents. Aromatic polyamides having an inherent viscosity of at least 0.6 in sulfuric acid and a melting point of at least 300° C. were prepared.

U.S. Pat. No. 3,094,511 discloses a process for producing wholly-aromatic polyamides having an inherent viscosity of at least 0.6 and water-white clarity with a melting point above about 300° C. by effecting reaction between an aromatic diamine and an aromatic diacid halide. As acknowledged at columns 5 and 6, amorphous and crystalline fibers or films are produced, but crystalline polymers were preferred for their retention of outstanding physical properties.

Two patents assigned to the Teijin Company disclose processes for preparing aromatic polyamides by reacting substantially equal molar amounts of diamine with a dihalide in an inert, nonbasic organic medium to form a precondensate and contacting the precondensate with an aqueous solution of water-soluble acid acceptor. These patents are as follows:

U.S. Pat. No. 3,640,970 initially discloses polyamide preparation by the interfacial polycondensation method of U.S. Pat. No. 3,006,899 and the low temperature polycondensation method described in U.S. Pat. No. 3,063,966 and problems associated with these procedures. The '970 patent then disclosed a precondensate method for polyamide preparation and suggested it was preferred to interfacial polycondensation method because it permitted better control of molecular weight of the product. With interfacial polymerization the degree of polymerization was susceptible to slight changes in the stoichiometric conditions of reactants. Low temperature solution polymerization techniques were difficult because of the selection of solvent and the separation of product from the solution. The latter problem was compounded because of by-product formation. In the '970 patent, a precondensate technique was disclosed wherein an aromatic diamine was reacted with an aromatic dicarboxylic acid dihalide in a polar, nonbasic, inert organic liquid medium under conditions such that a condensation product having a low degree of polymerization was formed. Ethers, ketones, sulfones, and halogenated hydrocarbons were suggested as being suitable solvents. After the precondensate was formed, the organic liquid medium containing precondensate was contacted with an aqueous solution of a water-soluble acid acceptor to complete the intended polyamide-forming reaction. Water-soluble acid acceptors suited for neutralizing by-product hydrohalide acid included inorganic and organic alkali-metal hydroxides, carbonates and bicarbonates as well as organic amines, e.g., triethylamine and triethylenediamine. Inherent viscosities of 0.6 to 3 in sulfuric acid were deemed possible.

U.S. Pat. No. 4,009,154 discloses a precondensate process for preparing aromatic polyamides using sodium carbonate hydrate as the acid acceptor. The patentees acknowledge that the two-stage process as described in the '970 patent, or, as sometimes referred to as the oligomer polymeriation process, permitted one to control the degree of polymerization more readily on a large scale. The patentees then noted that through the use of an acid acceptor in the form of sodium carbonate hydrate in an aqueous slurry, as opposed to an aqueous solution of an alkali compound, it was easier to obtain a high degree of polymerization. Other acid acceptors and their chracteristics were discussed. For example, when alkali metal hydroxides were used, the polymerization reaction system became strongly alkaline and hydrolysis of the carboxylic acid halide often took place. It was because of hydrolysis of the halide that it was difficult to obtain a high degree of polymerization. Alkaline earth metal hydroxides formed salts which were difficult to remove from the polymer. Organic amines such as triethylamine were often unsuited because of the difficulty in obtaining a high degree of polymerization. Example 25 of the '154 patent shows a process for preparing a polyamide of 2,4-toluenediamine and isophthalic acid chloride in cyclohexane and the polymerization subsequently finished by adding sodium carbonate and sodium chloride in water to the reaction product. The inherent viscosity of the polymer was 1.86.

German Pat. No. 26,06,878 discloses a process for the preparation of powdered aromatic polyamides. The process uses a solvent for the monomers but a nonsolvent for the polymer. In this process the aromatic diamine is reacted with an aromatic dicarboxylic acid in the absence of an acid acceptor and then reacted under anhydrous conditions in the presence of a tertiary amine in sufficient amount to neutralize the hydrogen halide formed. Examples of solvents for the polymerization include methylene chloride, chloroform, acetonitrile, dioxane and others. Example 2 shows the reaction of 2,4-diaminotoluene with isophthaloyl chloride in the presence of methylene chloride and chloroform. After all of the diamine is charged, the thus formed precondensate was contacted with triethylamine hydrochloride and triethylamine under reflux conditions. A polymer powder having a relative viscosity of 2.03 in N-methyl pyrrolidone was obtained.

SUMMARY OF THE INVENTION

This invention pertains to the preparation of toluenediamine based polyamides which are amorphous and have a high degree of polymerization. The compositions thus formed typically have inherent viscosities of at least 2 as measured at 30° C. in sulfuric acid (0.5 grams per 100 ml concentrated sulfuric acid). The amorphous polyamides are prepared by reacting an isomer mixture of toluenediamine containing from about 65–80% by weight of 2,4-toluenediamine or derivative and 20–35% of the 2,6-toluenediamine isomer or derivative with an aromatic diacid halide in the presence of an inert organic solvent. After the precondensate is formed, an acid acceptor is added thereby producing a high molecular weight polyamide.

To achieve extremely high molecular weights, it is preferred to produce the precondensate at a temperature from about 10°–18° C. and then subsequently polymerizing the precondensate to high molecular weight in the presence of an organic amine acid acceptor at a temperature ranging from about 25°–34° C.

There are several advantages achieved through the use of the 2,6-toluenediamine isomer of derivative in combination with the 2,4-toluendiamine isomer or derivative. A major contribution is in reducing the crystallinity of the resulting polymer. The amorphous nature enhances processability thus making it easier to produce fibers and films through solution casting or extrusion from the resulting polymer. Another contribution through process control is the higher degree of polymerization resulting in the higher molecular weight polymer. This not only enhances toughness but, gives required strength and physical properties necessary to satisfy multiple end use applications, for example, encapsulated systems for electrical equipment.

DETAILED DESCRIPTION OF THE INVENTION

The toluenediamine-containing polyamides of this invention are characterized in that they are the result of a combination of a mixture of 2,4- and 2,6-isomers of toluenediamine and derivatives. The isomer mixture utilized is one containing from about 65–80% by weight of the 2,4-isomer and from about 20–35% by weight of the 2,6-isomer. The addition of the 2,6-isomer in the amount set forth herein results in a polymer having substantially reduced crystallinity as opposed to that produced when using the pure 2,4-toluenediamine isomer alone. The toluenediamine isomers and derivatives thereof are represented by the formula

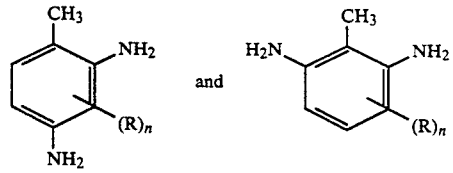

wherein R is a $C_{1-6}$ alkyl e.g. methyl, ethyl, propyl, tert-butyl tert-amyl; or cyclopentyl or cyclohexyl radicals. The alkyl derivatives are ortho to the amino group and tend to retard the activity of one of the amino groups and toluenediamines of reduced activity may require control of the reaction under conditions such that by-product formation is avoided. Unsubstituted toluenediamine or when the alkyl group is in the 4-positon as in 2,6-toluenediamine, are highly reactive and the reaction usually takes place instantaneously without little combination. Examples of toluenediamines and/or the derivatives suited for practicing the invention include 2,4-toluenediamine, 2,6-toluenediamine, 5-tert-butyl-2,6-toluenediamine; 3-tert-butyl-2,6-toluenediamine; 3,5-diethyl 2,4- and 2,6-toluenediamine; 5-isopropyl-2,4-toluenediamine 3,5-diisopropyl-2,4- and 2,6-toluenediamine 5-tert-amyl-2,4-toluenediamine; and 3-tert-amyl-2,6-toluenediamine. Optionally, a small quantity of another aromatic diamine e.g. from 0 to about 30 mole % of the diamine required may be used as a diamine component. Examples include phenylenediamine, either meta or para; xylenediamine, and ethyl and propylphenylenediamine.

The aromatic acid dihalides, suited for practicing the invention are those commonly used in the production of aromatic polyamides and the specific examples of aromatic dicarboxylic acid dihalides are isophthalic acid chloride, terephthalic acid chloride, 2,6-naphthalene dicarboxylic chloride, 4-methyl isophthalic acid chloride, and methyl terephthalic acid chloride. Other examples include meta-aminobenzoyl chloride hydrochloride, p-aminobenzyl chloride hydrochloride, 1-aminonaphthalene-5-carboxylic acid chloride hydrochloride and so forth.

The molar ratio of aromatic diamine to aromatic dicarboxylic acid dihalide suitable for forming the amorphous polyamides may be any ratio from to 1-99 moles aromatic diamine per 1 to 99 moles of aromatic diacid halide. Preferably, a stoichiometric ratio of from about 1 mole diamine per mole of aromatic diacid halide is used to achieve the highest molecular weight product.

In the process of producing the high molecular weight toluenediamine containing aromatic polyamides the preferred technique is the precondensate technique. A precondensate is formed followed by the subsequent polymerization of the precondensate to high molecular weight polymer. The precondensate method typically uses an inert organic solvent and as acknowledged as preferred in West German Pat. No. 26,06,878 one in which the monomers are soluble, but the polymer is not. Examples of solvents suited for preparing the precondensate include organic solvents such as tetrahydrofuran, dioxane, anisole, m-nitroanisole, p-chloroanisole, halogenated hydrocarbons such as methylene chloride, chloroform, and 1,2-dichloroethane as well as nitriles such as propionitrile, acetonitrile and benzonitrile. The solvent typically is used at a level about 2 liters per mole of the aromatic diamine. The same solvent used for forming the precondensate may be used for effecting polymerization of the precondensate to form high molecular weight polymer. Halogenated solvents such as methylene chloride are preferred solvents.

Polymerization of the precondensate is achieved by liberating and neutralizing the acid e.g., hydrohalide through the use of an acid acceptor. Acid acceptors such as organic amines e.g. lower alkyl tertiary amines such as trimethylamine, triethylenediamine, methylmorpholine and hexamethylenetetramine can be used. Such acid acceptors are well known and are used in amounts sufficient to neutralize the acid generated. Often where organic acid acceptors are used, e.g., triethylamine it is preferred to use the hydrohalide of the amine as a promoter for the amine acid acceptor. Usually this is present at the beginning of the addition of tertiary amine to the solution containing precondensate and preferably in an amount from about 2 to 3 g/100 ml solvent.

To achieve the highest molecular weights possible, particularly with a toluenediamine isomer mixture, the temperature of reaction during the precondensate formation is particularly important. Temeratures from about 10° to 18° C. are preferred for the precondensate formation. Temperatures lower than about 5° C. result in long reaction times and increased by-product formation. Temperatures above about 25° to 30° C. in the precondensate formation result in by-product formation and precondensate formation of higher molecular weight than desired. As acknowledged in the precondensate technique the degree of polymerization is controlled, to provide an inherent viscosity of from 0.2 to 0.3, (0.5 grams of polymer in 100 milliliters of concentrated sulfuric acid at 30° C.). After formation of the precondensate and, on addition of tertiary amine acid acceptor high molecular weight toluenediamine-containing polyamides are formed.

In the polymerization of the precondensate to high molecular weight, temperatures ranging from about 25°-34° C. are preferred as it is believed that these temperatures clearly provide the highest molecular weight in the resulting polymer. Temperatures higher or lower than this range tend to cause a reduction in molecular weight. For toluenediamine systems, inherent viscosities of at least 2 and preferably above 2.5, can be achieved while conventionally higher temperatures and other common processing techniques for producing the toluenediamine-containing polyamides result in polymers having substantially lower molecular weights, e.g. inherent viscosities of 1.4 and below.

Aromatic films of toluenediamine containing polyamides offer an attractive combination of properties desired for electrical/electronic applications including high glass transistion temperature (Tg), amorphous character, high thermal stability, toughness, combined with the electrical properties required for these applications. The films can be utilized as cast from various solvents and optionally biaxially oriented to improve mechanical properties. The high Tg, transparent, thermally stable films provide excellent mechanical and electrical properties and are resistant to oil, grease, and many solvents. The aromatic polyamides containing toluenediamine can be coated with a thin metallic film via vacuum metallizing, sputtering, or arc spray coating technique for EMI (electromagnetic interference) shielding applications. Similar films can also be prepared for antistatic applications where electrostatic discharge is required for sensitive electrical parts where an insulating film is needed as a support for the conductive surface.

In addition, to the above applications, the aromatic polyamide films can be used to enclose electronic components by vacuum forming techniques applied slightly above the Tg of the polyamides. Thin film coatings can also be prepared via solution casting directly onto a surface. Such electrical/electronic applications involve wire and cable coatings, electronic device (e.g. semiconductors) coatings and the like.

The aromatic toluenediamine containing polyamides can be formed into tough transparent films by conventional solvent film casting techniques. In addition to dense films, porous films can also be formed by casting the aromatic polyamide onto a stainless steel belt followed by immersion into a liquid which is a solvent for the solvent used to dissolve the aromatic polyamide but a non-solvent for the aromatic polyamide (e.g. water, methanol, isopropanol).

The following examples are intended to illustrate various embodiments of the invention and are not intended to restrict the scope thereof. All parts are expressed as parts by weight and all percentages are expressed as percent by weight. All inherent viscosities ($\eta_{inh}$) are determined as solutions of 0.5 gm polymer in 100 ml concentrated sulfuric acid at 30° C. and reported in units of dl/g.

EXAMPLE 1

High molecular Weight Polyamide

This example shows the production of poly(toluenediamine isophthalamide) by reaction of 2,4- and 2,6-toluenediamine in an 80/20 weight ratio with isophthaloyl chloride. Temperature control during formation of the prepolymer and polymerization steps is exercised, and a very high molecular weight product is obtained.

Procedure

A nitrogen purge was introduced to a 15 gallon glass reactor equipped with an overhead stirrer and cooling coils. Dry methylene chloride (7 liters) was added to the reactor under nitrogen, and cooling was initiated. Freshly distilled toluenediamine (366.0 gm, 3.0 moles of 80/20 2,4/2,6-toluenediamine) and isophthaloyl chloride (609.0 gm, 3.0 moles) were each dissolved in dry methylene chloride (5 liter) under nitrogen with stirring. The reactor stirrer was turned on (720 rpm), and the toluenediamine (82 ml/min) and isophthaloyl chloride (41 ml/min) solutions simultaneously pumped into the reactor. During this period, reactor temperature ranged from 10°-18° C., but was typically 14°-16° C. After the addition of the toluenediamine solution was complete, addition of the isophthaloyl chloride solution was continued to completion. A low molecular weight precondensate was formed.

Polymerization of the precondensate to high molecular weight polyamide was effected by allowing reactor temperature to rise to 20° C., and then adding triethylamine hydrochloride (340 gm, 2.47 moles) to the reactor. Stirrer speed was increased to 1325 rpm to maintain vigorous agitation and a solution of triethylamine (666.6 gm, 6.6 moles to provide about 10% excess) in dry methylene chloride (5 liter) was added (41 ml/min). During the addition of triethylamine, the temperature of the polymerization was maintained within a range from 26°-29° C. When addition of triethylamine was complete, the reaction mixture was filtered, and the solid polymer washed well with methanol in a Waring blender (3 times with 1 liter at room temperature and once with 1 liter in refluxing methanol) to provide 602.6 gm (79.7%) of a white amorphous powder, $\eta_{inh}=2.35$.

EXAMPLE 2

Low Temperature Polymerization of Precondensate

The procedure of Example 1 was followed, with the exception that polymerization was carried out within the same general temperature range as was used in forming the precondensate, i.e., 14°-17° C. Poly(-toluenediamine isophthalamide) was obtained in 54% yield; the $\eta_{inh}$ of the product was 0.29.

EXAMPLE 3

High Temperature Precondensate Polymerization

The procedure of Example 1 was repeated, with the exception that the polyermization step was carried out at 40° C. (the boiling point of methylene chloride). Poly(toluenediamine isophthalamide) was obtained in 85% yield; the $\eta_{inh}$ of the product was 1.48. Although the molecular weight of the polyamide increased from Example 2, the molecular weight was much lower than in Example 1.

EXAMPLE 4

Low Temperature Precondensate Polymerization

The procedure of Example 1 was followed with the exception that the polymerization step was carried out at a temperature ranging from 19°-25° C. Poly(-toluenediamine isophthalamide) with an inherent viscosity of 1.76 was obtained. Although this temperature for polymerization resulted in a higher molecular weight polymer tha the low temperature polymerization of Example 2, the molecular weight was below that of Example 1 which used a higher polymerization temperature.

EXAMPLE 5

High Temperature Precondensation and Polymerization

The procedure of Example 1 was followed, with the exception that both precondensate formation and polyermization were carried out at 40° C. Poly(toluenediamine isophthalamide) with an inherent viscosity of 0.69 was isolated. The higher temperature precodensate formation resulted in an amorphous polymer having a molecular weight lower than was obtained in Example 3. Preparation of the prepolymer within the preferred temperature range, followed by polymerization at a temperature just below the preferred range, provides a polyamide with lower inherent viscosity and molecular weight than that obtained in Example 4.

EXAMPLE 6

High Molecular Weight TDA Polyamide Testing (80/20)

A sample of TDA isophthalamide was prepared from toluenediamine mixed isomers and isophthalic acid chloride in accordance with Example 1. This polymer exhibited an inherent viscosity of 2.4 as measured in concentrated $H_2SO_4$ at 25° C. The product was dissolved in dimethylacetamide and cast into thin films of 25 to 75 micron thickness in a vacuum oven heated from 60° C. at the start of devolatilization to 200° C. over a six hour time period under vacuum. This procedure was followed to prevent bubble formation in the film if too rapid heating was utilized. The resultant transparent film was removed from the glass casting plate by brief immersion in water. Several ⅜ inch wide strips of the film were cut and placed in a circulating oven at 250° C. Samples were removed periodically and tested for strength and elongation. The results are shown in Table I.

TABLE I

| Exposure Time (250° C.) | 250° C. Tensile Modulus (psi) | Thermal Aging Tensile Strength (psi) | Elongation (%) |
|---|---|---|---|
| Control | 643,000 | 23,300 | 16 |
| 1 Day | 628,000 | 22,300 | 11 |
| 3.5 Days | 587,000 | 22,900 | 8 |
| 5 Days | 571,000 | 21,100 | 7 |
| 15.5 Days | 632,000 | 21.000 | 6 |
| 37 Days | 608,000 | 20,000 | 5 |

EXAMPLE 7

The film of Example 6 was cut into ⅜" strips and placed in an air circulating oven at 265° C. Samples were removed periodically and tested for strength and elongation. The results are shownin Table II.

TABLE II

| Exposure Time (250° C.) | 250° C. Tensle Modulus (psi) | Thermal Aging Tensile Strength (psi) | Elongation (%) |
|---|---|---|---|
| Control | 463,000 | 17,900 | 7 |
| 7 Days | 443,000 | 17,500 | 7 |
| 11 Days | 444,000 | 16,100 | 5 |
| 14 Days | 360,000 | 16,900 | 6 |
| 19 Days | 400,000 | 17,100 | 7 |
| 21 Days | 411,000 | 20,600 | 7 |

The lower modulus and strength for the control of Example 6 versus that of this example believed due to the difference in measuring the thickness of the thin films. A mechanical micrometer was used for Example 6 and an electronic micrometer was used for this example. Both sets of data in Examples 6 and 7 show excellent retention of tensile strength after thermal aging. Tensile modules at both 250° C. and 265° C. were excellent and tensile modules were retained over an extended period of time.

EXAMPLE 8

Porous TDA Isophthalamide Film Preparation

A solution of 15 wt. % of the TDA isophthalamide prepared in accordance with Example I was dissolved in dimethylacetamide. The resultant solution was cast onto a glass plate and allowed to set for one minute. The glass plate was slowly immersed into water. The solution turned opaque in less than one minute time interval indicating the coagulation of the polyamide. After a 24-hour water extraction, the film was released from the glass plate and a porous film was obtained. Sample cross-sections were viewed at high magnification using a Scanning Electron Microscope and showed the porous nature of the resultant film. Such porous films offer advantages in obtaining unique electrical properties (e.g. dielectric constant).

EXAMPLE 10

TDA Polyamide Dynamic Mechanical Testing

A film was cast from the TDA isophthalamide prepared in accordance with Example I from a solution of dimethylacetamide onto a glass plate. The sample ws devolatilized in a vacuum oven up to 200° C. After removal from the glass plate, the sample was submitted for dynamic mechanical testing using the RMS-605 from Rheometrics. The tensile modulus (E'), data were determined at 1 Hz over the temperature range of 25° C. to 320° C. as noted below.

| Temperature | E' Modulus (Dynes/cm$^2$) | E" Loss Modules | Tan S Tan$\Delta$ |
| --- | --- | --- | --- |
| 24° C. | $1.79 \times 10^{10}$ | $1.71 \times 10^9$ | 0.0953 |
| 54° C. | $1.75 \times 10^{10}$ | $1.54 \times 10^9$ | 0.0880 |
| 83° C. | $1.75 \times 10^{10}$ | $1.57 \times 10^9$ | 0.0897 |
| 123° C. | $1.68 \times 10^{10}$ | $1.50 \times 10^9$ | 0.0896 |
| 152° C. | $1.64 \times 10^{10}$ | $1.42 \times 10^9$ | 0.0869 |
| 202° C. | $1.70 \times 10^{10}$ | $1.59 \times 10^9$ | 0.0936 |
| 222° C. | $1.78 \times 10^{10}$ | $1.73 \times 10^9$ | 0.0972 |
| 236° C. | $1.67 \times 10^{10}$ | $1.92 \times 10^9$ | 0.115 |
| 246° C. | $1.30 \times 10^{10}$ | $2.56 \times 10^9$ | 0.197 |
| 255° C. | $5.10 \times 10^9$ | $1.46 \times 10^9$ | 0.285 |
| 266° C. | $1.87 \times 10^9$ | $6.28 \times 10^8$ | 0.335 |
| 275° C. | $6.58 \times 10^8$ | $3.39 \times 10^8$ | 0.514 |
| 290° C. | $1.03 \times 10^8$ | $1.53 \times 10^8$ | 1.486 |
| 299° C. | $4.13 \times 10^7$ | $2.89 \times 10^7$ | 0.699 |
| 314° C. | $1.72 \times 10^7$ | $8.01 \times 10^6$ | 0.467 |

The E' modulus remained substantially stable through about 250° C. which shows the excellent stability of the polyamide resin under dynamic testing. The E' modulus dropped as temperature increased above 250° C. but remained good up through 300° C. Loss modules and tan delta are measurements of hysteresis of the elastomer. The E" modulus remained high for good dampening properties.

What is claimed is:

1. In a process for the production of aromatic polyamides by the reaction of at least one aromatic diamine with aromatic diacid halide, in the presence of an inert solvent under conditions for forming a low molecular weight precondensate and then subsequently polymerizing the precondensate in the presence of an acid acceptor, the improvement wherein the at least one aromatic diamine comprises a mixture of aromatic diamines represented by the formulas:

 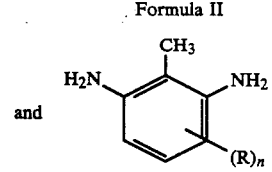

Formula I and Formula II wherein R is hydrogen or $C_{1-6}$ alkyl radical and n is 1 or 2; and wherein the weight percent of the aromatic diamine represented by formula I and that of formula II in the mixture is from 65 to 80% by weight and 20-35% respectively.

2. The process of claim 1 wherein the mole ratio of aromatic diacid aromatic diamine to halide is about 1:1.

3. The process of claim 2 wherein n is 1.

4. The process of claim 3 wherein the precondensate is formed at a temperature of from about 10° to 18° C.

5. The process of claim 4 wherein the polymerization of the precondensate is carried out at a temperature ranging from about 25°-34° C.

6. The process of claim 5 wherein the aromatic diacid halide is an phthaloyl halide.

7. The process of claim 6 wherein the phthaloyl halide is selected from the group consisting of isophthaloyl chloride and terephthaloyl chloride.

8. The process of claim 7 wherein R is $C_2$–$C_4$ alkyl.

9. The process of claim 8 wherein R is tert-butyl.

10. The process of claim 7 wherein R is hydrogen.

11. The process of claim 10 wherein said phthaloylhalide is isophthaloyl chloride and 80% the aromatic diamine is represented by the Formula I composition and 20% by the Formula II composition.

12. In a polyamide composition formed by the reaction of at least one aromatic diamine with aromatic diacid or derivative, the improvement which comprises an amorphous polyamide produced from about 65–80% of a toluenediamine represented by the formula I

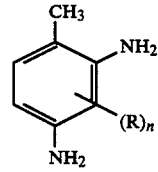

Formula I wherein R is hydrogen or $C_1$–$C_6$ alkyl group, and n is 1 or 2 and from about 20–35% of a toluenediamine represented by the formula II

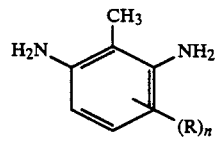

Formula II wherein R is hydrogen or $C_1$–$C_6$ alkyl and n is 1 or 2.

13. The polyamide of claim 12 wherein the aromatic diacid is a phthaloyl halide.

14. The polyamide of claim 13 wherein said phthaloyl halide is a phthaloyl chloride.

15. The polyamide of claim 14 wherein said phthaloyl chloride is isophthaloyl chloride or terephthaloyl chloride.

16. The polyamide of claim 15 having an inherent viscosity of at least 2 dl/g as measured in concentrated sulfuric acid at 30° C. and the polyamide is present in an amount from 0.5 per 100 ml sulfuric acid.

17. The polyamide of claim 16 wherein R in said aromatic diamine is hydrogen and n is 1.

18. The polyamide of claim 17 wherein the phthaloyl halide is isophthaloyl chloride.

19. The polyamide of claim 18 wherein the mole ratio of toluenediamine to isophthaloyl chloride is about 1:1.

20. The polyamide of claim 19 wherein the ratio of toluenediamine of Formula I to II is about 80/20.

* * * * *